(12) United States Patent
Lehavi

(10) Patent No.: US 7,447,745 B2
(45) Date of Patent: Nov. 4, 2008

(54) SYSTEM AND A METHOD FOR ACCELERATING COMMUNICATION BETWEEN A CLIENT AND AN EMAIL SERVER

(75) Inventor: Shauli Lehavi, Reut (IL)

(73) Assignee: Flash Networks, Ltd, Herzliya (IL)

(*) Notice: Subject to any disclaimer, the term of this patent is extended or adjusted under 35 U.S.C. 154(b) by 840 days.

(21) Appl. No.: 10/500,405

(22) PCT Filed: Jan. 5, 2003

(86) PCT No.: PCT/IL03/00014

§ 371 (c)(1),
(2), (4) Date: Jun. 25, 2004

(87) PCT Pub. No.: WO03/058372

PCT Pub. Date: Jul. 17, 2003

(65) Prior Publication Data
US 2005/0108020 A1    May 19, 2005

Related U.S. Application Data

(60) Provisional application No. 60/346,683, filed on Jan. 7, 2002.

(51) Int. Cl.
*G06F 15/16* (2006.01)
(52) U.S. Cl. .................................................. 709/206
(58) Field of Classification Search ......... 709/206–207; 455/412.1, 412.2, 426.1; 370/338
See application file for complete search history.

(56) References Cited

U.S. PATENT DOCUMENTS 5,586,260 A * 12/1996 Hu .............................. 726/12
5,826,269 A * 10/1998 Hussey ........................ 707/10
6,057,841 A *  5/2000 Thurlow et al. ............. 715/809
6,134,432 A * 10/2000 Holmes et al. ............ 455/412.1
6,208,731 B1 *  3/2001 DePond et al. .......... 379/376.01
6,356,937 B1 *  3/2002 Montville et al. ........... 709/206
6,401,112 B1 *  6/2002 Boyer et al. ................. 709/206

(Continued)

OTHER PUBLICATIONS

Lloyd, Sharon, "Microsoft Outlook and Exchange Client," Mar. 1998.*

*Primary Examiner*—Nathan Flynn
*Assistant Examiner*—J. Bret Dennison
(74) *Attorney, Agent, or Firm*—Smith Frohwein Tempel Greenlee Blaha, LLC; Gergory Scott Smith (57) ABSTRACT

The communication between a remote email or application program and the server to which it interfaces, such as a mailbox exchange server, is improved. The present invention operates by tricking or controlling the application program in such away that the application program operates as thought it is on-line although in actuality it is off-line. This is accomplished by spoofing the application program and as a result, the application program operates off-line but the user has on-line type experience. More specifically, the present invention replaces the MAPI/RPC as the transport provider while the user is operating the application program in an off-line mode. The data transfer between the email application program and the email server is handled by the present invention in the background. On the server end of the connection, the present invention operates to spoof the server and thus causes the server to operate as though the remote customer is an interactive user presently connected to the domain.

19 Claims, 9 Drawing Sheets

U.S. PATENT DOCUMENTS

| | | |
|---|---|---|
| 6,526,413 B2 | 2/2003 | Schwitters et al. |
| 6,564,264 B1 * | 5/2003 | Creswell et al. ............. 709/245 |
| 6,574,617 B1 * | 6/2003 | Immerman et al. ............. 707/1 |
| 6,578,054 B1 * | 6/2003 | Hopmann et al. ........... 707/201 |
| 6,697,844 B1 * | 2/2004 | Chan et al. ................. 709/206 |
| 6,760,754 B1 * | 7/2004 | Isaacs et al. ............... 709/206 |
| 6,792,085 B1 * | 9/2004 | Rigaldies et al. ......... 379/88.13 |
| 7,143,419 B2 * | 11/2006 | Fischer et al. ............... 719/328 |
| 7,162,543 B2 * | 1/2007 | Fischer et al. ............... 709/248 |
| 2003/0041110 A1 * | 2/2003 | Wenocur et al. ............ 709/206 |
| 2003/0053448 A1 * | 3/2003 | Craig et al. ................. 370/353 |
| 2006/0173951 A1 * | 8/2006 | Arteaga et al. ............. 709/203 |
| 2008/0134031 A1 * | 6/2008 | Aufricht et al. ............. 715/700 |

* cited by examiner

SYSTEM AND A METHOD FOR ACCELERATING COMMUNICATION BETWEEN A CLIENT AND AN EMAIL SERVER

CROSS-REFERENCE TO RELATED APPLICATION

This application claims the priority of U.S. Provisional Patent Application No. 60/346,683 filed Jan. 7, 2002, entitled "A SYSTEM AND A METHOD FOR ACCELERATING COMMUNICATION BETWEEN CLIENT AND MS EXCHANGE SERVER" and International Application Number PCT/IL03/00014 fled on Jan. 5, 2003 and entitled "A SYSTEM AND A METHOD FOR ACCELERATING COMMUNICATION BETWEEN CLIENT AND AN EMAIL SERVER" the subject matter of which are hereby incorporated by reference.

TECHNICAL FIELD

The present invention relates to the field of data communications and, more specifically, to the enhancement of transferring data throughput in communication system between an Email Server and a client utilizing Email software.

BACKGROUND OF THE INVENTION

Historically, in server based networks serving one or more clients, the servers have utilized powerful computers while the client computers have utilized computers possessing limited computing power and limited storage capacity. Generally, communication between the clients and the servers has been enabled through the use of a LAN (Local Area Network) using a high capacity communication link and generating a domain.

A domain is a group of computers and devices on a network that are administered as a unit with common rules and procedures. Within the Internet, domains are defined by the IP address that is assigned. All devices sharing a common part of the IP address are said to be in the same domain.

Therefore, in client/server architectures, the storage and the processing is primarily performed on the server side while the client computer operates as a terminal and an interface unit between the user and the server. Obviously, this type of an architecture results in heavy transportation of information between the client and the server. It should be noted that the terms "client" and "user" are used interchangeably herein.

In recent years, the portable computer has experienced explosive growth in utilization, as well as in the performance capabilities, features, processing power, memory availability and capabilities. There has also been a great deal of expansion in use and availability of the global data communication network known as the Internet, and the use of portable communication systems like, but not limited to, cellular or satellite systems.

It is desirable for an enterprise that is using a client/server architecture, for example MICROSOFT OUTLOOK and the MS exchange server, to provide users with the ability to access their MS Office documents and E-mail messages while being out of the office and connected through the Internet via telephone lines or a wireless network, like but not limited to Cellular or Satellite networks. Outlook is Microsoft's mail client and personal information manager. The full version includes a PIM (Personal Information Manager) calendaring, to-do list and groupware functions. OUTLOOK also provides a journaling capability for keeping track of hourly billing. OUTLOOK can be used as the client end to MICROSOFT'S Exchange Server or as the e-mail client with any ISP (Internet Service Provider) account. The paragraphs that follow refer to an MS exchange server as an example of an Email Server of the present invention, and to OUTLOOK as an example of an Email application.

One technical hurdle, in meeting this desire, is that the wireless communication systems or networks have a limited bandwidth. Using such limited bandwidth networks to replace a LAN results in increasing the communication time between the remote users and reduces the quality of the connection.

Therefore there is a need in the art for a system and a method that can reduce the transportation between a remote user and a server in an on-line operation. Such a system can increase the speed of the communication. Further, there is a need in the art for a system and method to reduce the transportation between a remote user and a server over a wireless communication channel.

A specific example of this need can be seen in the setting of a user mailbox within an exchange server. In this setting, the user mailbox is part of the exchange server information store. The information store consists of three implementations of MAPI message stores: the public information store, the private information store, and the personal folder store (PST). MAPI is an abbreviation of Messaging Application Programming Interface, a system built into Microsoft Windows that enables different e-mail applications to work together to distribute mail. As long as both applications are MAPI-enabled, they can share mail messages with each other. The paragraphs that follow refer to MAPI as an example of an application programming interface of the present invention.

The information store organization of public folders, private folders, and messages is referred to as the organization hierarchy. Another implementation of a MAPI message store is configured when a user works offline or not connected to the exchange server. This message store is called the offline folder store (OST) and the content and structure of the OST mirrors the mailbox while offline.

A mailbox is the delivery location for all incoming mail messages addressed to a designated owner. Information in a user's mailbox is stored in the private information store on a Microsoft Exchange Server computer. A mailbox can contain received messages, message attachments, folders, folder hierarchy, and more.

OUTLOOK uses MAPI over Remote Procedure Calls (RPC) as it's transport provider to connect the user to its mailbox that resides physically at the exchange server as part of the information store. RPC is a call that is based on a client server model. Procedures that are called within the client application are actually performed within the server side over a communication channels. The MAPI transport provider and the MAPI message store, called the exchange server service, are tightly coupled in such a way, that it is impossible to use only the MAPI message store and a different transport provider and still maintain the provision of all the services the Exchange server service offers.

Using RPC as the communication between a remote user and its mailbox at the exchange server over low bandwidth is very slow and has a lot of communication overhead. When the user uses OUTLOOK in the offline mode, outgoing messages are kept in the user outbox in its offline folders, and incoming messages are kept for him at the exchange server. When the user is going back online, the exchange server and outlook synchronize those messages. This process results in a significant amount of data transfer to occur, depending on the amount of traffic received and the time that the user has been off line. In a wireless configuration, this process can absorb a significant percentage of the available bandwidth. Thus, there is a need in the art for a method to reduce the transportation between a remote user and a server in an on-line operation when large amounts of data, such as during a synchronization function, is necessary.

SUMMARY OF THE INVENTION

The present invention provides a system and a method that improves the on-line operation between a remote email or application program and the exchange server to which it interfaces, such as a mailbox exchange server. The present invention operates by tricking or controlling the email application program in such away that the email application program operates as it is on-line although it is off-line. In an embodiment of the present invention, this is accomplished by spoofing the OUTLOOK application program and as a result, the OUTLOOK system operates off-line but the user has on-line type experience.

More specifically, the present invention replaces the MAPI/RPC as the transport provider while the user is operating the email application program in an off-line mode. The data transfer between the email application program and the email server is handled by the present invention in the background. On the server end of the connection, the present invention operates to spoof the server and thus causes the server to operate as though the remote customer is an interactive user presently connected to the domain.

Another aspect of the present invention is using the multi-tasking feature of an NT machine to overcome the MAPI session limitation of an Exchange Server. The Exchange Server operates to enable only a limited number of MAPI sessions per interactive user's computer. The present invention overcomes this limitation by generating a separate task for each active remote user (a User Agent (UA)). This method of spoofing the Exchange Server enables the Exchange server to support a plurality of remote users via a single NT/Win2000 machine or equivalents.

An exemplary embodiment of present invention may include, but is not limited to, two logical modules that work within the client/server architecture:

(1) A Domain Logical Module (DM), which is installed on an NT machine or similar machine and has a computer account in the domain; and (2) A Client Logical Module (CM), which is installed in the client's computer as an extension of the mail program.

The present invention may be a DLL OUTLOOK extension/add-in, and replaces the MAPI/CDO as the transport provider. CDO, or Collaboration Data Objects is a technology for building messaging or collaboration applications. DLL is short for Dynamic Link Library, a library of executable functions or data that can be used by a Windows application. Typically, a DLL provides one or more particular functions and a program accesses the functions by creating either a static or dynamic link to the DLL. A static link remains constant during program execution while a dynamic link is created by the program as needed. DLLs can also contain just data. DLL files usually end with the extension ".dll". A DLL can be used by several applications at the same time. Some DLLs are provided with the Windows operating system and available for any Windows application. Other DLLs are written for a particular application and are loaded with the application as in the exemplary embodiment of the present invention.

CDO is the bridge from Visual Basic and scripting languages to MAPI. CDO exposes COM objects, but these COM objects are of the right nature to be accessible through both languages.

The present invention may be used in conjunction with an additional system, which operates to accelerate the communication over a problematic network channel such as, but not limited to cellular, satellite or other wireless channels. This additional system may operate to compress or otherwise modify the communication protocol to create a more efficient protocol or make other changes and adjustments. Examples of such additional systems include NettGain 1100 of Flash Networks. If the accelerating system is used, two additional modules may be needed—one in each end of the problematic line. However, it should be noted that these additional modules are not required elements of the present invention but rather, can be incorporated into the present invention. These additional modules include:

Client Booster (C. BST).

Gateway Booster (G. BST).

The present invention supports substantially all OUTLOOK built-in forms, such as the E-mail messages, appointments, contacts, calendar, tasks etc.

Other objects, features, and advantages of the present invention will become apparent upon reading the following detailed description of the embodiments with the accompanying drawings and appended claims.

BRIEF DESCRIPTION OF THE DRAWINGS

FIG. 4a and FIG. 4b are a flow chart illustration of a method implemented by an exemplary embodiment of the present invention during the login stage.

DETAILED DESCRIPTION

Referring now to the drawings, in which like numerals refer to like parts throughout the several views, exemplary embodiments of the present invention are described.

Figure 1:
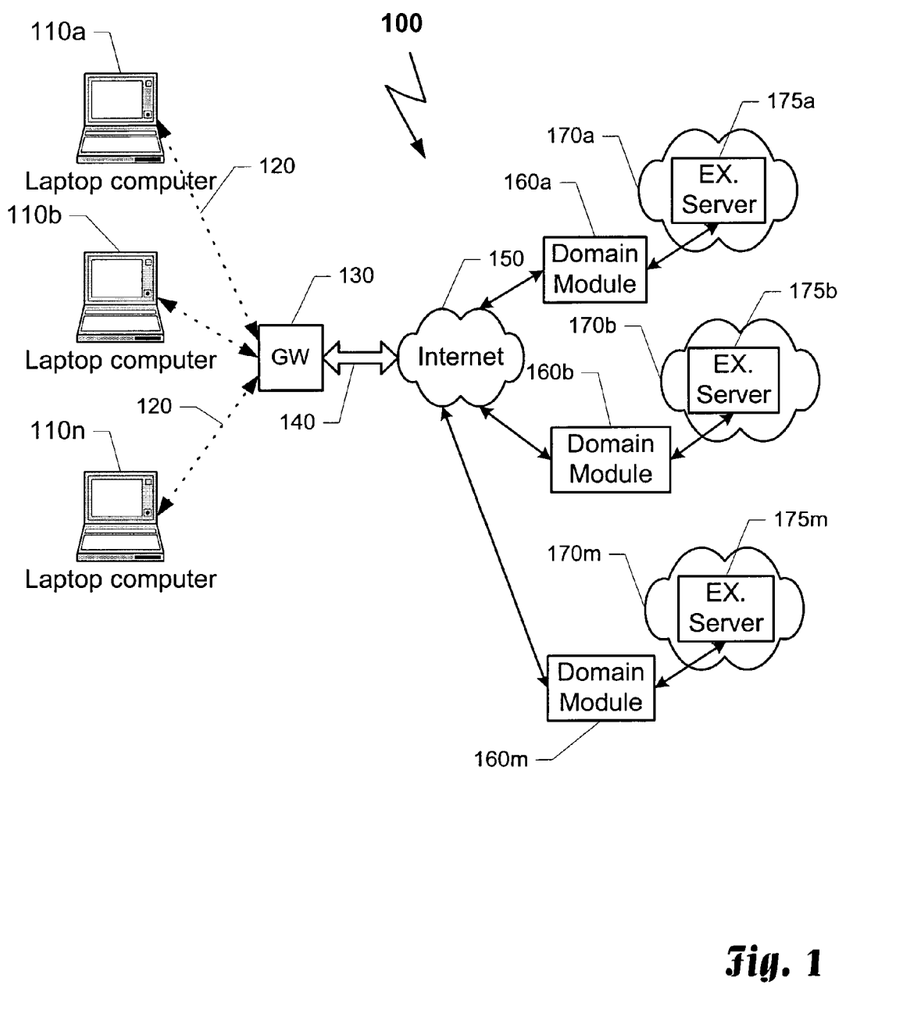
FIG. 1 is a block diagram illustrating a common environment in which an exemplary embodiment of the present invention may be used.

FIG. 1 is a block diagram illustrating a common environment in which the present invention may be used. A cellular system 100 has been selected as an exemplary environment that is suitable for implementing the present invention. However, it should be noted, and readily observable to those skilled in the art, that the present invention is not limited to operation within a cellular environment, and for that matter, any other specific communications system. But rather, the present invention can be implemented using various communication systems such as, but not limited to, satellites, the PSTN (Public Switched Telephone Network), ISDN (integrated services digital network) lines etc.

A plurality of laptop computers 110*a* to 110*n* are connected via cellular connections 120 to a gateway (GW) 130, which can be located in a particular cell or in an operator station. The laptop computers 110 may represent any portable devices that use MAPI messages services for communicate with an exchange server, like but not limited to palm computers, cellular phones etc., and will collectively be referred to as client 110.

The communication over connection channels 120 can be based on TCP/IP or, it can be based on a proprietary accelerating protocol. In case of using a proprietary accelerating protocol, two additional modules are needed (one for each end of the line 120).

GW 130 may be connected via a VWB (Very Wide Bandwidth) connection 140 to the Internet 150 and from there, via the appropriate Domain Modules (DM), 160*a* to 160*m*, to the domain of each of the cooperates, 170*a* to 170*m*, which comprises the appropriate Exchange Server, 175*a* to 175*m*.

More than one client 110 may be connected to the same domain 170 via the same DM 160 and be engaged in an interactive connection with the same Exchange Server 175 simultaneously.

Figure 2A:
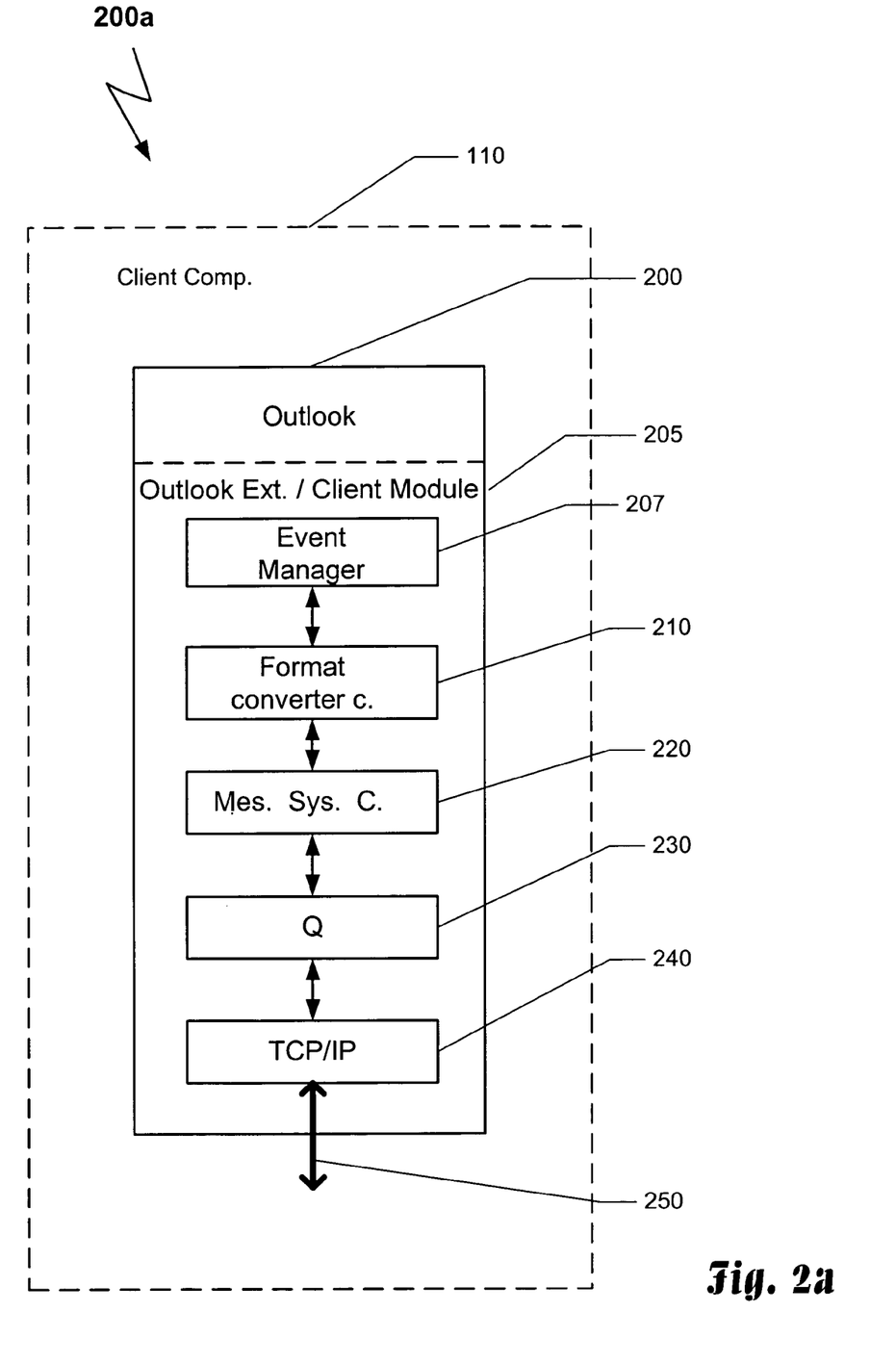
FIG. 2a illustrates a block diagram of an exemplary embodiment of a Client Module (CM).

FIG. 2*a* illustrates a block diagram of an exemplary embodiment of a Client Module (CM). The CM 205 is a OUTLOOK extension DLL. The CM 205 operates to receive indications from OUTLOOK, or some other email application program, when a new message has been submitted to the outbox; change the message from the messaging application format into a proprietary messaging format (Msg. FT) and export the translated message over TCP/IP.

The CM 205 comprises several modules including: Event Manager 207; format converter 210; Messaging System (Mes. Sys.) 220; priority queue (Q) 230 and TCP/IP module 240.

The User, operating an email application program in an off-line mode and desiring to send an outgoing message, presses the send button, or its equivalent, and the message is submitted to the outbox. The email application program then indicates to its extensions that a new message is waiting in the outbox. Upon receiving this indication, the Event Manager 207 calls the Format Converter 210, which reads the new message in MAPI format and translates it into the Mes. FT. The Mes. FT is a chain of properties, which, among other things, includes the message. The format converter 210 which translates the MAPI message into the Mes. FT and vice versa, may select part of the properties that are sufficient to reconstruct the right message in the other side of the communication channel.

Mes. Sys. 220 receives the chain of objects of the new converted message, organizes it into a complete message and sends the complete message to the queue 230. By using a proprietary messaging format, the present invention has the flexibility to be connected to a mail client and personal information manager system, other than OUTLOOK, by simply modifying the Event Manager 207 and the Format Converter 210, to fit the API of the other mail system.

Queue 230 organizes the messages according to the priority that has been chosen or selected by the user. Queue 230 is the buffer between OUTLOOK and the network. Transmitting and receiving of the messages are transparent to the user, thus giving the user off-line operation with an on-line experience.

The output of the queue 230 is transferred to the TCP/IP module 240 that handles the communication over TCP/IP from or to OUTLOOK. The TCP/IP module 240 picks a complete message from the queue 230 and transfers it over TCP/IP via the configured socket. The TCP/IP module 240 also maintains the connection and tries to reconnect to its defined socket in case the connection has been broken.

In the exemplary embodiment of FIG. 2*a*, the message is then sent out over TCP/IP.

Figure 2B:
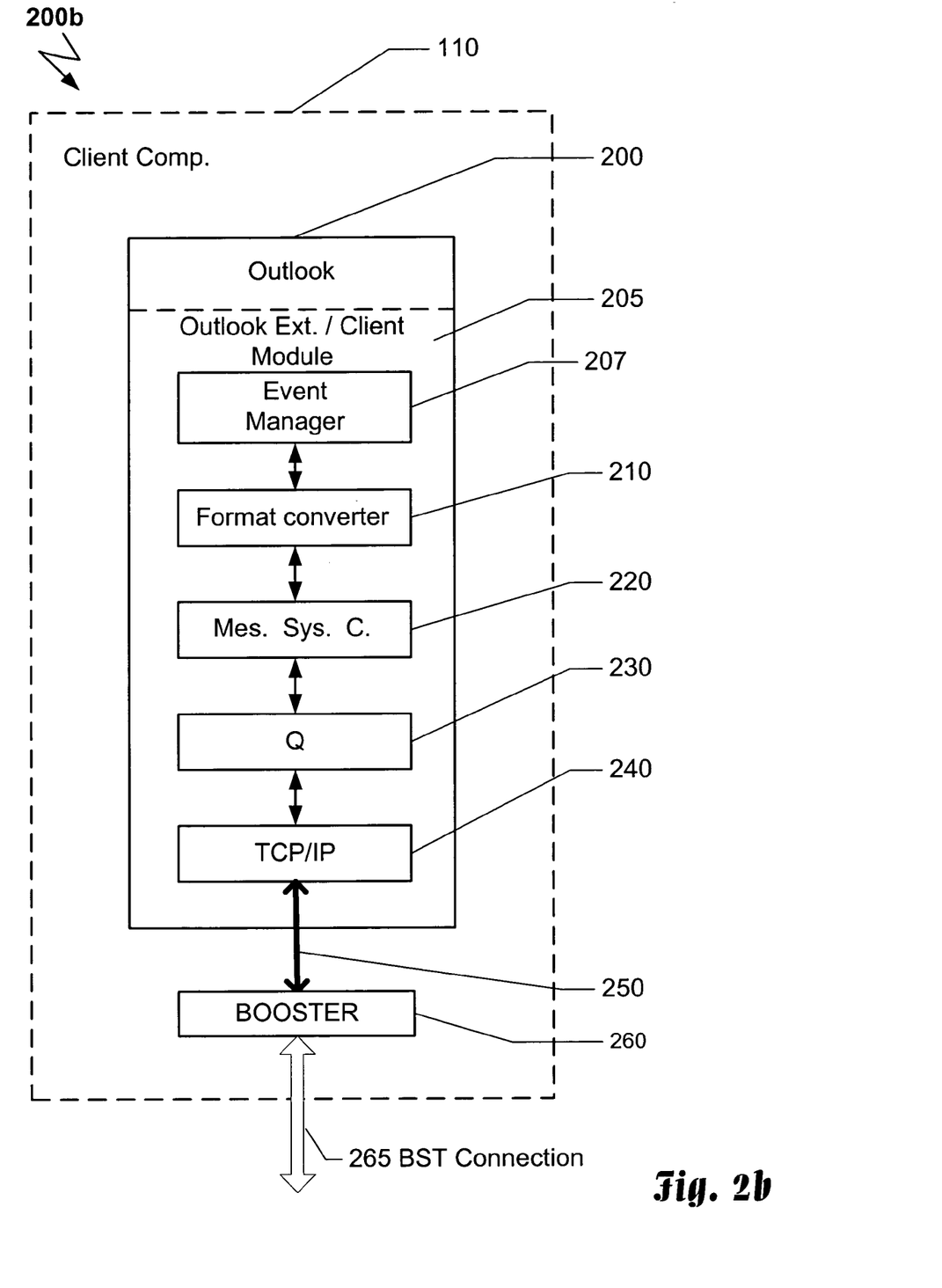
FIG. 2b illustrates a block diagram of an exemplary embodiment of a Client Module (CM), which is connected to a booster module.

Alternatively, in the exemplary embodiment of FIG. 2*b*, the message from OUTLOOK is sent via TCP/IP to a booster unit 260 that translates the TCP/IP buffers into a more efficient protocol, manipulates the message to accelerate the communication and sends the transformed message via a proprietary tunnel (BST connection) 265 to the GW 130.

In the other direction, when a message is received from the Exchange Server 175 (FIG. 1), the TCP/IP module 240 handles the data on a packet basis and transfers it to the input section of queue 230. The data from queue 230 is transferred to Mess. Sys. 220. The Mess. Sys. 220 gathers the information from the relevant packets into the whole message and transfers it to the format converter 210. The format converter 210 translates the proprietary format back to the MAPI format, and the message is then transferred to its destination (e.g. the inbox, the calendar etc.). In parallel, the Event Manger 207 sends an indication to the user that the message has arrived at client 110.

Incoming messages can occur in one of two methods. In one method, a new message notification has been sent to the user's mailbox within the Exchange Server 175 and wakes up the user agent to start downloading the message. In another method, the user presses the Send/Receive button on the OUTLOOK menu when the OUTLOOK application is not connected. The Event Manager 207 that waits for this event, sends a refresh message to the user agent to instruct the user agent to start download new messages.

Figure 3:
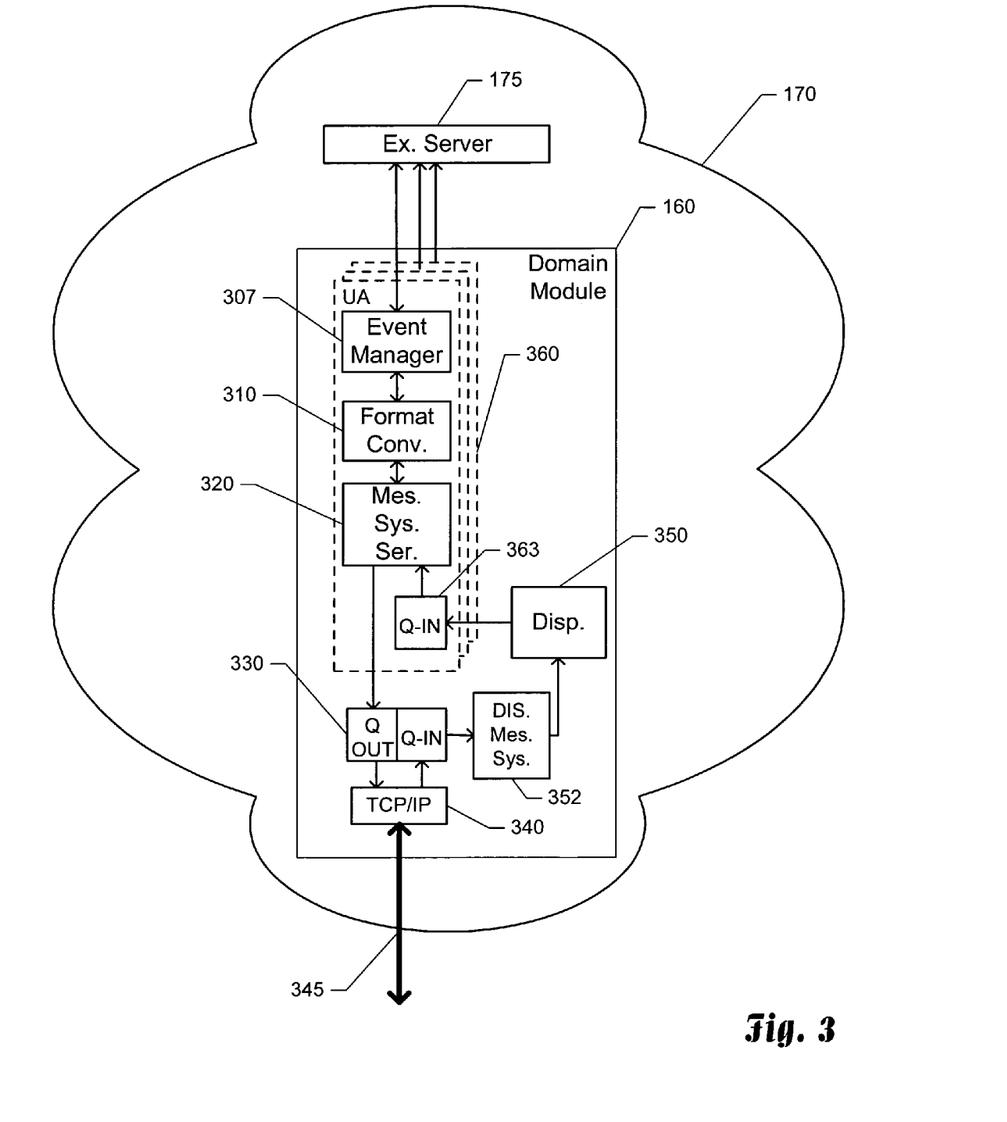
FIG. 3 illustrates a block diagram of an exemplary embodiment of a Domain Module (DM) in a corporate domain.

FIG. 3 illustrates a block diagram of an exemplary embodiment of a Domain Module (DM) 160 in a Corporate Domain 170. Corporate Domain 170 comprises an Exchange Server 175 and an exemplary DM 160.

The DM 160 may be an NT machine, a Window 2000 machine etc., and comprises several logical modules including: a TCP/IP module 340, a DM priority queue (Q) 330, Dispatcher 350 with its Messaging System 352, and a plurality of User Agents (UA) 360.

On the upper side, the DM 160 is connected to an Exchange Server 175 and on the other side is connected to a plurality of clients 110 via TCP/IP connection 345 over the Internet (not shown in FIG. 3). Because OUTLOOK in the client computer 110 is operating in off-line mode, the transportation between the CM 200 and the DM 160 is carried by a proprietary Transport Provider over the TCP/IP connection 345.

The TCP/IP logical module 340 handles the incoming data from the remote user, via the configured socket, on a packet basis, processes them according to the protocol and transfers the data to the input section of queue 330. The TCP/IP module 340 also maintains the connection and tries to reconnect to its defined socket in case the connection has been broken.

The data from the input section of queue 330 is grabbed by the Dispatcher Mess. Sys. 352. The Dis. Mess. Sys. 352 pulls the information, organizes it into a message and transfers the message to the Dispatcher 350.

Dispatcher 350 reads the envelop of the message and, based on its current dispatching list, determines whether the source of the message is a new remote user 110. If the source of the message is a new user, the Dispatcher 350 assigns a free User Agent 360 to the new user, adds this assignment to its dispatching list and submits the message to the selected UA 360. If the source of the message is not a new user, the Dispatcher 350, based on the dispatching list, transfers the message to the appropriate UA 360.

UA 360 represents its assigned user in front of the Exchange Server 175. The UA 360 performs login and logout in the name of current user of the remote client 110, spoofing the Exchange Server 175 into operating as though the remote user is connected locally to the domain and operating as an interactive user, who receives and transmits OUTLOOK messages and mail.

A UA 360 comprises of priority queue logical module 363, Mes. Sys. logical module 320, format converter logical module 310 and Event Manager logical module 307.

Uploaded messages from the remote user are submitted by the Dispatcher 350 to the input section of priority Queue 363 of the UA 360. Messaging System 320 pulls the information from the input section based on its priority, organizes the information into a message in the proprietary messaging format and transfers it to the Format Converter 310. Format Converter 310 translates the proprietary messaging format into MAPI/CDO format and transfers the message in MAPI format to the Event Manager 307.

Upon receiving a new message from the remote user, the Event Manager 307 determines whether the message is a Login-request or an Inter Personal Messaging (IPM) message. If the message is a Login-request, the Event Manager 307 impersonates as the remote user and performs a logon sequence to the Exchange Server 175 on behalf of this user. The Event Manager 307 uses the credentials of the remote user that have been collected by the Event Manager 207 of the CM 200 and initiates a MAPI session in the Exchange Server 175. The operation of the UA Event Manager 307 is described in more detail below.

Moreover, in some embodiments the: UA Event Manager 307, the Format Converter 310 and the Mes. Sys. 320 may be combined into a single logical module or into two logical modules instead of the three modules of the current exemplary embodiment.

Messages from the Exchange Server 175 to the remote users, which are currently connected to the DM 160, are processed by the appropriate UA 360 and submitted to the output section of Priority Queue 330. The output section of the Priority Queue 330 of the DM 160, collects the outgoing messages from each UA 360. The outgoing messages, from Priority Queue 330, preferably based at least in part on their priority, are pulled and processed by TCP/IP logical module 340 and are sent as packets over TCP/IP to the appropriate user of remote client 110.

Alternatively, in another exemplary embodiment (not shown in the drawings) a booster unit may be used between the TCP/IP logical module 340 and the network. This booster unit manipulates the transportation into a more efficient protocol, manipulates the message to accelerate the communication and sends the transformed message via a proprietary tunnel (BST connection) to the GW 130. This unit may perform the complementary operations of the booster unit 260 in FIG. 2b.

As part of the installation process of the CM in its computer, the user is required to select one of its on-line OUTLOOK profiles. The user may generate this profile by using the Windows Mail Configuration within the control panel.

Figure 4A:
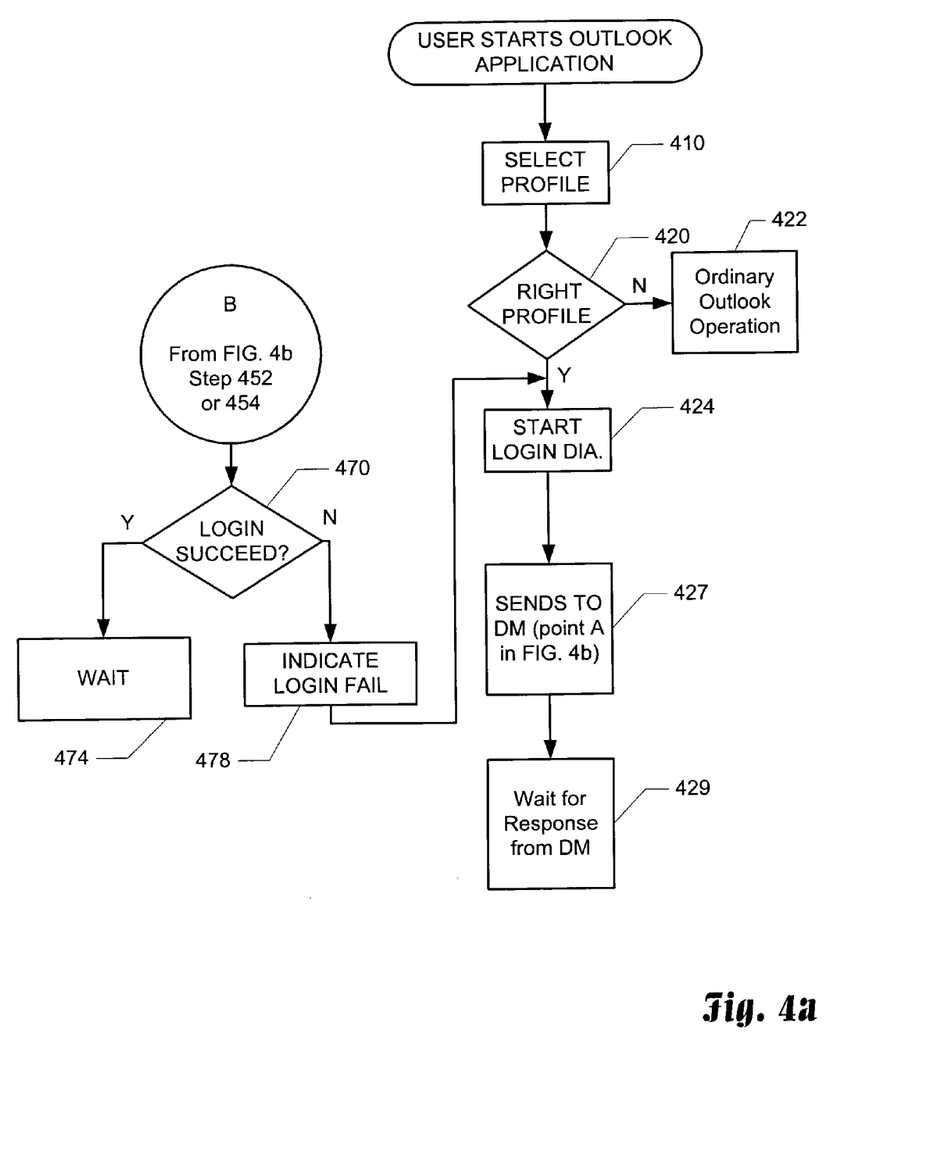
FIG. 4a illustrates a method implemented by an exemplary embodiment of a Client Module and FIG. 4b illustrates a method implemented by an exemplary embodiment of a Domain Module.

FIG. 4a is a flow chart illustrating one method for implementing an exemplary embodiment of a CM 205 (FIGS. 2a&2b) during the login stage. The OUTLOOK application, upon initiation by the user, prompts the user at step 410 to select one of the OUTLOOK Profiles. At step 420, if the selected profile is a profile that does not invoke the present invention, the CM 205 is not initiated and processing continues at step 422 where the user may use OUTLOOK in its common way of operation.

If at step 420 the selected profile is a profile that invokes the present invention, the CM 205, at step 424, starts the Login process with the user. This step includes prompting the user with a login dialog box, in which the user is required to enter his credentials (user name, password domain name and the Exchange Server name). In one embodiment, the CM 205 may be configured to take these credentials from the user profile without prompting the user for the dialog box.

The user credentials with additional configuration parameters (for example: compression attributes, the last synchronization time etc.) are sent over the network to the DM 160 (FIG. 1) at step 427, using the TCP connection 250 (FIGS. 2a&2b) or via a booster system 260 in case that such a system exists. Then the CM 205 is waiting 429 for receiving a response from DM 160.

Figure 4B:
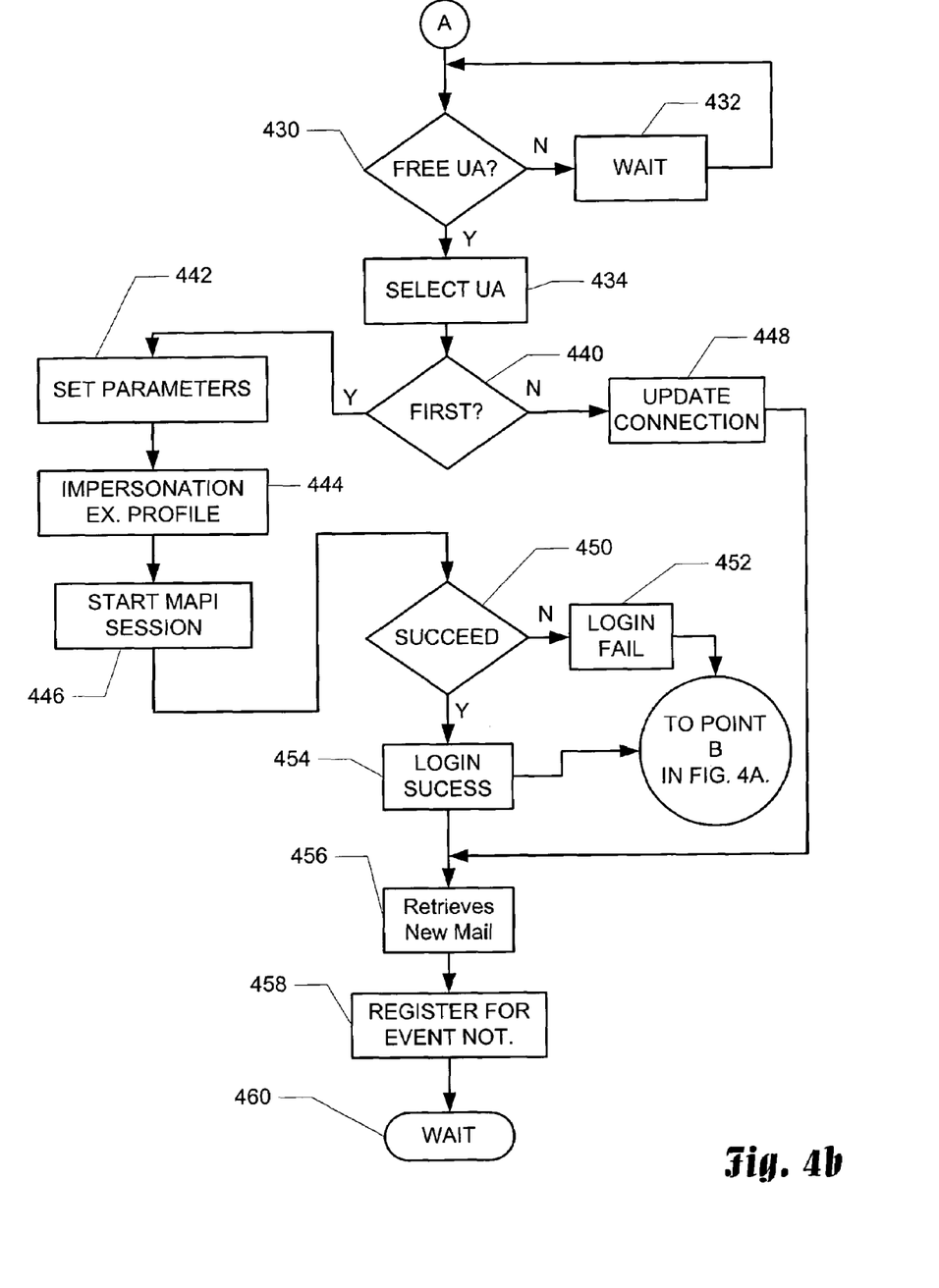

FIG. 4b is a flow chart illustrating one method for implementing an exemplary embodiment of a DM 160 during the login stage. Upon receiving a Login request from a remote user, the Dispatcher 350 (FIG. 3) verifies (not shown in the drawing) whether the remote user has been assigned a UA 360 (FIG. 3). If the remote user has been assigned a UA 360, the Dispatcher 350 forwards the request to the appropriate UA 360. If there is no assignment yet, at step 430 the Dispatcher 350 determines whether there is a free UA. If there are no free UAs, at step 432 the Dispatcher 350 waits until a time-out expires and then rechecks for a free UA at step 430 again. If there is a free UA 360, at step 434 the Dispatcher 350 assigns the client to the UA 360, updates its assignment table and forwards the call to the selected UA 360.

Upon receiving the Login-request, at step 440 the Event Manager 307 of the selected UA 360 determines whether it is the first Login-request of this user 110. If this is not the first Login-request, at step 448 the Event Manager 307 (FIG. 3) updates the connection parameters and processing continues at step 456 and retrieves new mail.

However, if it is the first Login-request of a new user 110 (FIG. 1), processing continues at step 442 where the selected UA 360 gets the current client's parameters and starts the impersonation process at step 444. During the impersonation process, the UA 360 performs an NT login to the domain 170, and impersonates the remote user 110 by using the client credentials. The UA 360 then creates an OUTLOOK profile for this new client, on the machine on which the DM 160 runs, pretending that it is the remote client and at step 446, starts a MAPI session to the Exchange Server.

At step 450, if the credentials of the user are valid and the login succeeds, at step 454 the UA 360 sends a Login-success message to the CM 205 and the CM 205 processing continues at point B in FIG. 4a. In parallel, the UA 360 processing continues at step 456 to synchronizes the mailbox.

At step 450, if the credentials of the user are not valid and the login fails, the UA 360 enters the login fail process at step 452 which sends a Login-fail message to the CM 205 and causes the CM 205 to continue processing at point B in FIG. 4a. Then, the UA 360 provides notice to the Dispatcher 350 about the disconnection and enters into a free position. The Dispatcher 350 updates its assignment table by removing this assignment.

At step 456 the UA 360 retrieves all new messages, which have arrived to the user's mailbox (within the exchange server) between the last login and the current login, and sends these messages to the remote client 110 via the CM 205. Then at step 458, the UA 360 registers itself for new message notification within the user's mailbox.

From this point forward, as long as there is a valid connection between the client 110 and the DM 160, the new messages will be automatically downloaded to the user's off-line mailbox through the DM 160 and CM 205 (FIGS. 2a&2b).

Returning now to the operation of the CM 205, FIG. 4a point B, upon receiving the response for the Login-request, at step 470 the CM 205 determines whether the login has been successful. If the login has been successful, at step 474 the CM 205 waits for the next event, which may be incoming mails from the Exchange Server or outgoing messages from the user 110. If the login fails, the CM 205 sends 478 a Login-fail indication to the user 110 and processing continues at step 424 where the CM 205 prompt the user to login again.

Figure 5:
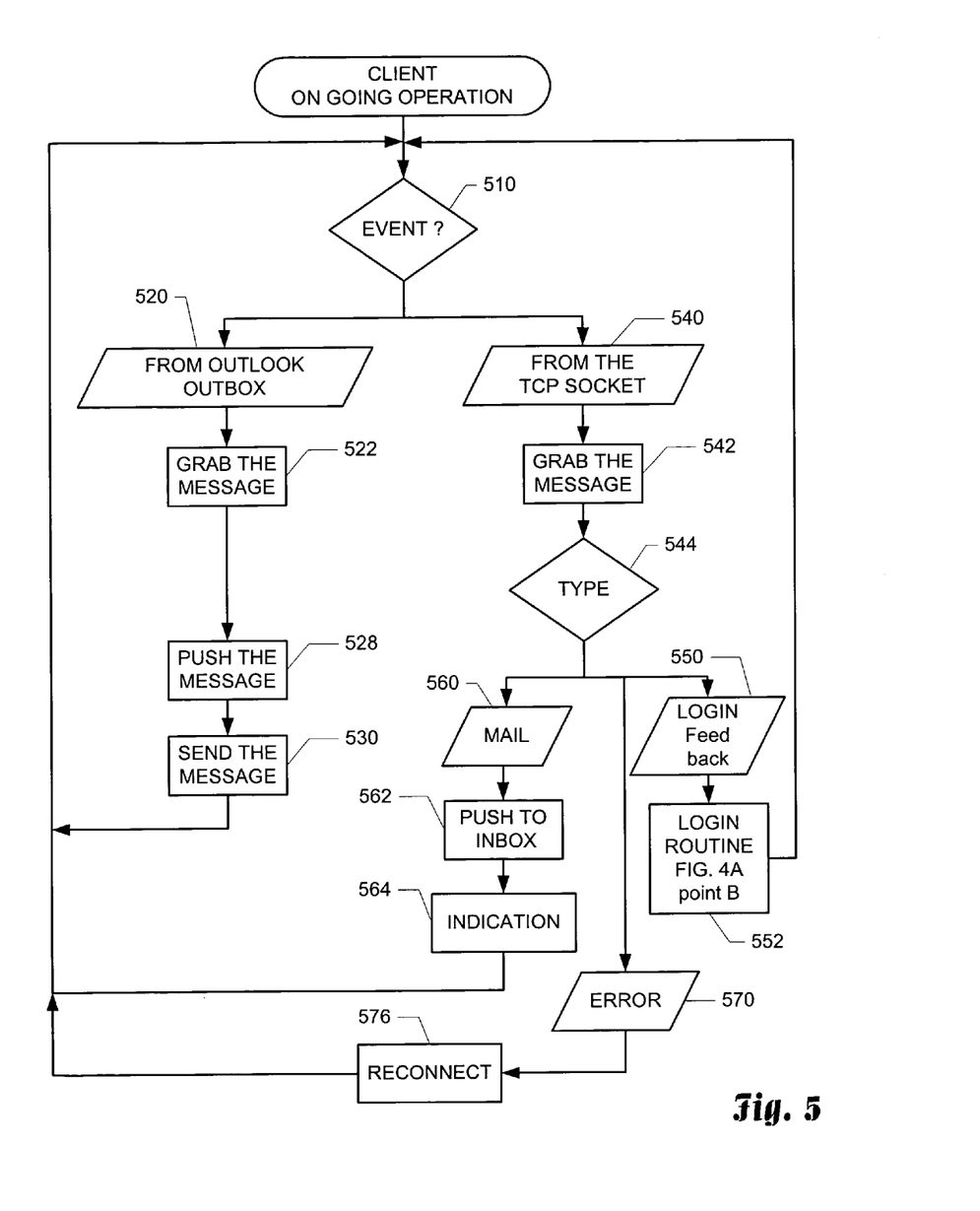
FIG. 5 illustrates a method implemented by an exemplary embodiment of a Client Module during on going operation after the Login stage.

FIG. 5 illustrates a method implemented by an exemplary embodiment of a CM 205 during the on going operation after the login stage. Initially, the CM 205 is waiting for a notification that an event has occurred. Upon receiving an event notification, at step 510 the CM 205 determines whether the event arrived 520 from the OUTLOOK outbox or from 540 the TCP/IP connection.

If the event arrives from the OUTLOOK outbox, which means that the user has sent a new message, processing continues at step 522. The new message may be mail, calendar, task etc. At step 522, the CM 205 grabs the message from the outbox and pushes it via the chain comprising the Format Converter 210, the Mes. Sys. 220, the output section of priority queue 230 and the TCP/IP module 240 and at step 530 sends the message over the network as described above in conjunction with FIG. 2a. The CM 205 then returns to step 510 to wait for the next event.

If the event arrives from the TCP/IP connection indicating that new message arrives from DM 160 (FIG. 1), processing continues at step 542. The message may be a mail, calendar, task etc. message. At step 542, the CM 205 grabs the message via the chain as described above, and at step 544 determines the type of the message. If the type of the message 560 is mail or calendar, at step 562 the CM 205 pushes the message into the inbox of the remote client 110 and at step 564, sends an indication to the user. Then the CM 205 returns to step 510 and waits for the next event.

If the type of the message is an error message 570, at step 576 the CM tries to reconnect again by returning to step 424 in FIG. 4a and continues from there. If the type of the message is login feedback 550 from the DM 160, at step 552 the CM 205 performs the part of the process, which is described above in conjunction to FIG. 4a, from point B.

Figure 6:
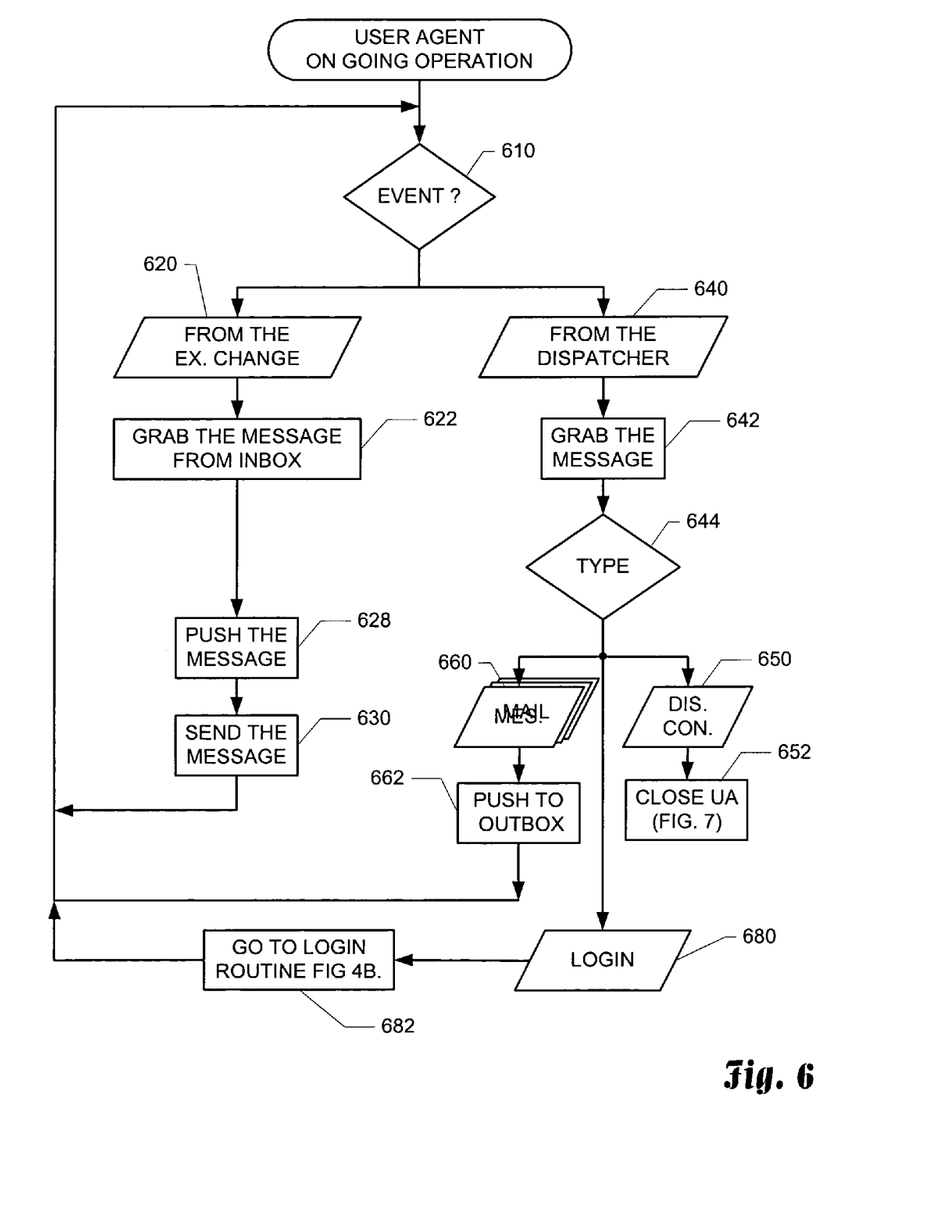
FIG. 6 illustrates a method implemented by an exemplary embodiment of a User Agent (UA) 360 during the on going operation, after the Login stage.

FIG. 6 illustrates one method for implementing an exemplary embodiment of a UA 360 (FIG. 3) during the on going operation, after the login stage. Initially, UA 360 is waiting for an event to occur. Upon receiving notification that an event has occurred, at step 610 the UA 360 determines whether the event arrived from the Exchange Server 175 (FIG. 1) (step 620) or from the Dispatcher 350 (FIG. 3) (step 640).

If the event 620 arrives from the Exchange Server 175, it means that the client 110 has received a new message. The new message may be mail, calendar etc. At step 622, the UA 360 grabs the message from the inbox of the relevant client 110 in the Exchange Server 175, and pushes it via the chain comprising the Format Converter 310 (FIG. 3), the Mes. Sys. 320 (FIG. 3), the output section of priority queue 330 and the TCP/IP module 340 (FIG. 3), and at step 630 sends the message over the network as described above in conjunction with FIG. 3. Then, the UA 360 returns to step 610 and waits for the next event.

If the event 640 arrives from the Dispatcher 350, it means that the client has sent this new message. The message may be a mail, calendar, login request etc. At step 542, the UA 360 grabs the message via the chain as described above and at step 644 determines the type of the message. If the type of the message is mail or calendar or etc. 660, then at step 662 the UA 360 submits it into the outbox in the Exchange Server 175 associated with the user 110. The Exchange Server 175 (FIG. 1) takes responsibility to deliver the message to its destination.

If the type of the message is a disconnection message 650, then the UA 360 closes the MAPI session with the Exchange Server 175 and clears up the allocated resources. Then the UA 360 provides notice to the Dispatcher 350 that the connection is broken and waits for new assignment.

If the type of the message is Login-request 680 from the CM 205, then at step 682 the UA 360 performs 682 the part of the login process, which is described above, in conjunction to FIG. 4b. At the end of the login process, the UA 360 returns to step 610 and waits for the next event.

Figure 7:
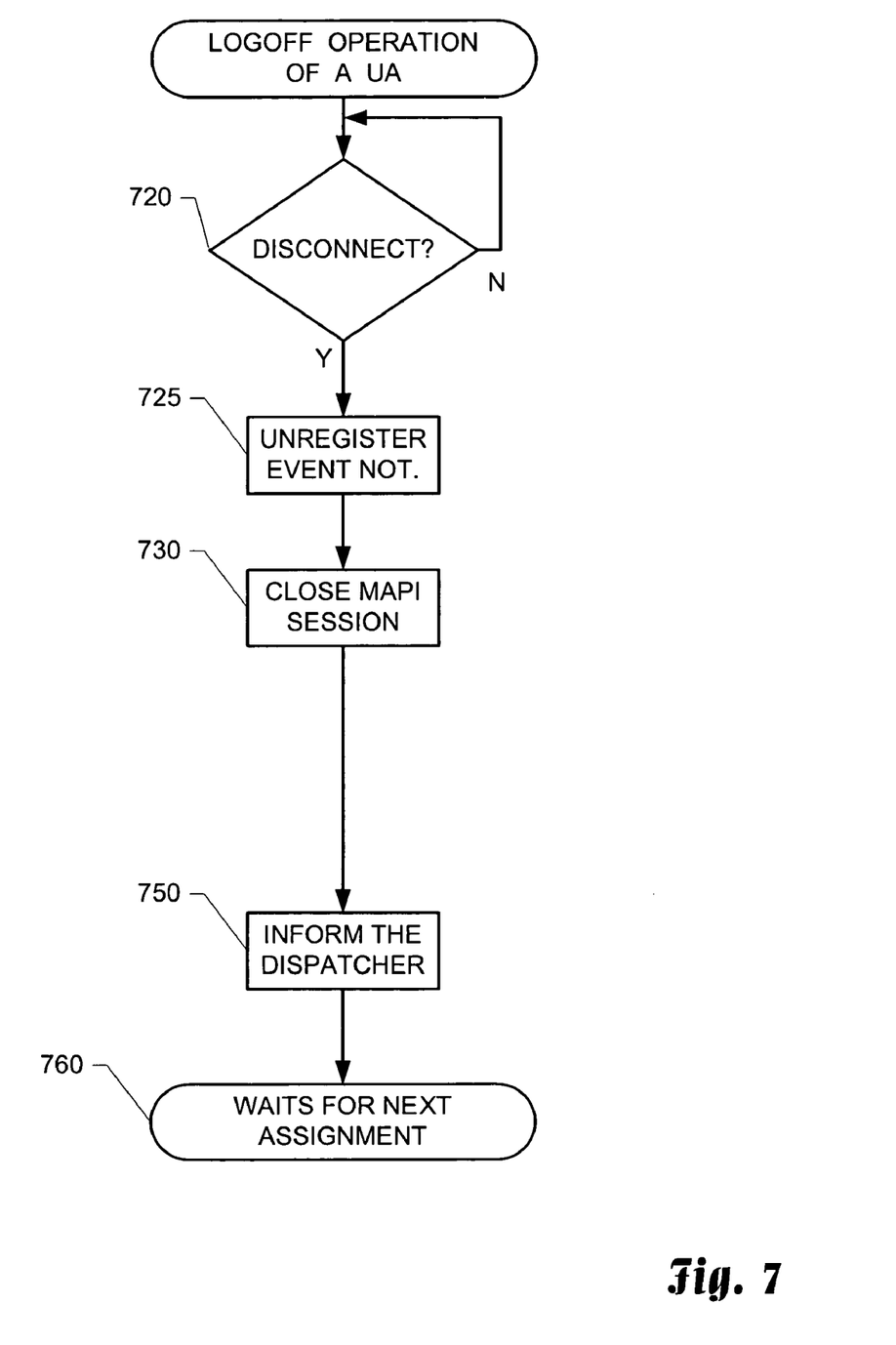
FIG. 7 illustrates a method implemented by an exemplary embodiment of a UA 360 during A Logoff stage.

FIG. 7 illustrates one method for implementing an exemplary embodiment of a UA 360 during the Logoff stage. This routine is initiated upon receiving a disconnection indication 720 from the TCP/IP module 340. Otherwise the UA 360 continues in its on going operation as described above in conjunction to FIG. 6. Upon receiving a disconnection indication 720, the UA 360 starts several operations for terminating the on-line operation within the Exchange Server. First of all, at step 725 the UA 360 unregisters itself from event notifications that occur in the mailbox at the Exchange Server 175. Then at step 730, the UA 360 closes the MAPI session within the Exchange Server 175. Upon terminating the logoff process within the Exchange Server 175, at step 750 the UA 360 notifies the Dispatcher 350 that it is free again and at step 760 waits for the next assignment.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A system for enabling the exchange of data between at least one remote user having a portable device with an email application program running in an off-line mode and an email server communicatively coupled to the portable device over a network, said system comprising:
    a client logical module; and
    a domain module;
    wherein the client logical module is installed in the portable device in association with the email application and the network and is adapted to:
        receive user credentials;

detect the generation of an outgoing message generated through the email application program while it is operating in an off-line mode;

transfer the outgoing message over the network toward the domain module;

receive incoming messages from the domain module; and transfer the incoming messages toward the email application program while the email application program is operating in an off-line mode; and the domain module communicatively coupled to the client logical module and operating in association with the email server, said domain module being adapted to:

impersonate the remote user, thereby appearing to the email server as though the email application program is connected directly to the email server in an on-line mode;

receive outgoing messages from the client logical module;

transfer the outgoing messages to the email server;

receive incoming messages from the email server; and provide the received incoming messages to the client logical module in the portable device.

2. The system of claim 1, wherein the network is a TCP/IP network.

3. The system of claim 1, wherein the application program is an email application program.

4. The system of claim 3, wherein the email application program is OUTLOOK.

5. The system of claim 1, wherein the domain module is further adapted to impersonate the remote user by performing a login procedure on behalf of the application program, thereby opening a communication session between the client logical module and the server.

6. The system of claim 4, wherein the communication session between the the client logical module and the server is a MAPI session.

7. A method for exchanging data between a plurality of remote users, each remote user having a remote portable device running an email application program in an off-line mode, and a server in a domain which is connected to the remote portable device over a TCP/IP network and a domain module, said method comprising the steps of:

sending a login request from at least one of the plurality of remote portable devices running an email application program in an off-line mode to the domain module, wherein the domain module is connected locally to the domain;

in response to receiving the login request, said domain module impersonating the email application program running on the remote portable device by logging into the server serving the email application program running on the remote portable device as it is connected locally to the domain;

opening a communication session between the email application program running on the remote portable device in off-line mode and the server; and transferring messages between the email application program running on the remote portable device in an off-line mode and the server via the domain module, wherein the email application program appears to operate as though it is on-line with the server.

8. The method of claim 7, wherein the remote client includes a client logical module, and the step of sending the login request further comprises the steps of:

receiving credentials from the remote client; and the client logical module forwarding the login request with the credentials to the domain module.

9. The method of claim 7, wherein the server is an exchange server.

10. The method of claim 7, wherein the communication between the domain module and the server is using MAPI.

11. A system for enhancing perceived throughput between a plurality of remote users, each remote user having a remote portable device which runs an OUTLOOK application in an off-line mode and communicates over a TCP/IP connection with an exchange server in a domain, said system comprising:

a client logical module; and a domain module;

wherein the client logical module is installed in the remote portable device in association with the OUTLOOK application and the network, and the client logical modules being adapted to:

receive credentials for a user of the remote portable device;

receive outgoing messages from a remote portable device outbox while the OUTLOOK application is operating in an off-line mode, and to transfer the outgoing messages over the TCP/IP network to the domain module; and receive messages from the domain module and transfer them to a remote portable device inbox in the OUTLOOK application while the OUTLOOK application is operating in an off-line mode;

a domain module, which is connected at one end to said TCP/IP network and at another end locally to the domain, for each said plurality of remote portable devices, said domain module being adapted to:

impersonate the remote portable device by spoofing the exchange server to operate as though the remote portable devices are connected directly to the domain;

login into the exchange server using the credentials of the user of the remote portable device while the OUTLOOK application is operating in off-line mode;

open a MAPI session for the remote portable devices;

receive messages from the client module of the remote portable devices;

transfer OUTLOOK messages to the exchange server;

receive messages destined to a remote portable devices from the exchange server; and submit the messages to the appropriate client module of the destined remote portable devices, whereby using said system allows the delivery of messages between the plurality of remote portable devices and the exchange server while in an off-line mode of operation of the OUTLOOK application without having to modify the exchange server.

12. A method for exchanging data between a remote user having a portable device running an application program in an off-line mode, and a server operating within a domain to which the remote client is remotely communicatively coupled via a domain module that is connected locally to the domain, said method comprising the steps of:

receiving credentials for the remote user while the application is running in an off-line mode;

detecting a MAPI formatted message from the application program, while the application is running in an off-line mode, that is directed to the sever;

retrieving and reformatting the message from MAPI format to a proprietary format;

transferring the reformatted message directed to the server to the domain module over a communication channel while the application is running in an off-line mode;

detecting the reception of the reformatted message at the domain module;

reformatting the reformatted message from the proprietary format to the MAPI format to create a MAPI message; and providing the MAPI message to the server.

13. The method of claim 12, further comprising the steps of:

sending a login request to the server;

in response to receiving the login request, emulating the actions that would normally be taken by the application program to login to the server; and opening a MAPI session between the application program and the exchange server, whereby the application program appears to operate as though it is on-line with the server.

14. The method of claim 12, wherein a MAPI session exists between the application program running on the remote client and the server to facilitate communication of messages, further comprising the steps of:

sending a disconnect request to the server;

in response to receiving the disconnect request, emulating the actions that would normally be taken by the application program to logoff the server; and closing the MAPI session between the application program and the exchange server.

15. The method of claim 12, further comprising the steps of:

detecting a message from the server that is directed to the application program;

reformatting the message from MAPI format to a proprietary format;

transferring the message to the application program over a communication channel;

detecting the reception of the message at the remote client;

reformatting the reformatted message from the proprietary format to the MAPI format to create a MAPI message; and providing the MAPI message to the application program.

16. The method of claim 15, wherein the application program is an email application program and the step of providing the MAPI message to the application program comprises placing the MAPI message into the inbox of the email application program.

17. The method of claim 12, wherein the application program is an email application program and the step of detecting a message from the application program comprises detecting a new message in the outbox of the email application program.

18. The method of claim 17, wherein the email application program is OUTLOOK, further comprising the steps of:

receiving a profile selection, the profile selection being associated with enabling the off-line operation; and enabling the off-line operation in conjunction with the profile selection.

19. The method of claim 17, wherein the email application program is OUTLOOK, further comprising the steps of:

receiving a profile selection, the profile selection not being associated with enabling the off-line operation; and disabling the step of detecting a message from the application program that is directed to the server.

* * * * *